United States Patent
Tsai et al.

(10) Patent No.: US 11,202,339 B2
(45) Date of Patent: Dec. 14, 2021

(54) APPARATUSES AND METHODS FOR PACKET DISTRIBUTION ON MULTIPLE SUBSCRIBER IDENTITIES

(71) Applicant: MEDIATEK INC., Hsinchu (TW)

(72) Inventors: Chih-Yuan Tsai, Hsinchu (TW);
Chao-Min Huang, Hsinchu (TW);
Wei-Chiang Peng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 19 days.

(21) Appl. No.: 16/817,714

(22) Filed: Mar. 13, 2020

(65) Prior Publication Data

US 2020/0329529 A1  Oct. 15, 2020

Related U.S. Application Data

(60) Provisional application No. 62/831,803, filed on Apr. 10, 2019.

(51) Int. Cl.
*H04W 88/06* (2009.01)
*H04W 48/18* (2009.01)
(Continued)

(52) U.S. Cl.
CPC ........... *H04W 88/06* (2013.01); *H04L 47/14* (2013.01); *H04W 8/183* (2013.01);
(Continued)

(58) Field of Classification Search
CPC ... H04W 88/06; H04W 12/06; H04W 12/069; H04W 48/16; H04W 48/18; H04W 36/14
(Continued)

(56) References Cited

U.S. PATENT DOCUMENTS

| 7,539,175 | B2 * | 5/2009 | White | H04W 88/06 |
| | | | | 370/350 |
| 8,112,117 | B2 * | 2/2012 | Jheng | H04W 12/069 |
| | | | | 455/558 |

(Continued)

FOREIGN PATENT DOCUMENTS

| EP | 3474625 A1 * | 4/2019 | ........ H04W 36/0088 |
| WO | 2016/164396 A1 | 10/2016 | |
| WO | WO2018132183 A1 * | 7/2018 | |

OTHER PUBLICATIONS

Communication System with Wireless Trunk, by Douglas G. Smith, et al Oct. 2003 (Year: 2003).*

(Continued)

*Primary Examiner* — William D Cumming
(74) *Attorney, Agent, or Firm* — McClure, Qualey & Rodack, LLP

(57) ABSTRACT

A wireless communication device including a plurality of wireless transceivers and a controller is provided. Each wireless transceiver performs wireless transmission and reception using a respective Radio Access Technology (RAT). The controller enables the wireless transceivers to provide a plurality of wireless connections using a plurality of subscriber identities, and selects a first wireless connection from the plurality of wireless connections for communications between a user device and the wireless communication device. Also, the controller selects a second wireless connection from the plurality of wireless connections according to a service type of a packet flow associated with the user device, for communications between a service network and the wireless communication device, and assigns the second wireless connection for routing packets of the packet flow between the user device and the service network.

5 Claims, 5 Drawing Sheets

(51) Int. Cl.
  *H04W 36/14* (2009.01)
  *H04W 28/02* (2009.01)
  *H04W 28/24* (2009.01)
  *H04W 8/18* (2009.01)
  *H04L 12/801* (2013.01)
  *H04W 76/16* (2018.01)

(52) U.S. Cl.
  CPC ....... *H04W 28/0268* (2013.01); *H04W 28/24* (2013.01); *H04W 36/14* (2013.01); *H04W 48/18* (2013.01); *H04W 76/16* (2018.02)

(58) Field of Classification Search
  USPC ............ 455/434, 458, 552.1, 558, 411, 418; 370/252, 336, 350, 434
  See application file for complete search history.

(56) References Cited

U.S. PATENT DOCUMENTS

| | | | | |
|---|---|---|---|---|
| 9,497,564 | B2* | 11/2016 | Ganesh | H04W 4/50 |
| 9,674,764 | B2 | 6/2017 | Jain et al. | |
| 9,788,190 | B2* | 10/2017 | Park | H04L 63/0853 |
| 9,942,816 | B2* | 4/2018 | Wirtanen | H04W 36/14 |
| 10,165,485 | B2* | 12/2018 | Wirtanen | H04W 72/048 |
| 10,547,890 | B2* | 1/2020 | Kwon | H04N 21/4182 |
| 10,863,423 | B2* | 12/2020 | Lee | H04L 69/18 |
| 2006/0193295 | A1* | 8/2006 | White | H04L 12/5692 370/336 |
| 2009/0215472 | A1* | 8/2009 | Hsu | G06K 19/0723 455/458 |
| 2009/0215473 | A1* | 8/2009 | Hsu | G06K 19/0701 455/458 |
| 2009/0239575 | A1* | 9/2009 | Fu | H04M 1/72403 455/552.1 |
| 2009/0239576 | A1* | 9/2009 | Liao | H04M 15/00 455/552.1 |
| 2013/0258870 | A1* | 10/2013 | Macias | H04W 48/18 370/252 |
| 2014/0256302 | A1* | 9/2014 | Chirayil | H04W 48/18 455/418 |
| 2015/0334111 | A1* | 11/2015 | Ziat | H04W 12/06 713/173 |
| 2015/0382178 | A1* | 12/2015 | Park | H04W 12/06 455/411 |
| 2016/0105540 | A1* | 4/2016 | Kwon | H04N 21/4312 715/747 |
| 2016/0157150 | A1* | 6/2016 | Wirtanen | H04W 48/16 455/434 |
| 2017/0181071 | A1* | 6/2017 | Lipka | H04W 48/18 |
| 2018/0152872 | A1* | 5/2018 | Wirtanen | H04W 72/048 |
| 2019/0069224 | A1* | 2/2019 | Lee | H04L 65/1073 |
| 2020/0329529 | A1* | 10/2020 | Tsai | H04W 28/24 |
| 2021/0076310 | A1* | 3/2021 | Lee | H04W 48/16 |
| 2021/0136645 | A1* | 5/2021 | Zhao | H04L 65/80 |

OTHER PUBLICATIONS

On the Packet Allocation of Multi-Band Aggregation Wireless Networks by Sanjay Goyal, Tan Le, Amith Chincholi, Tariq Elkourdi, Alpaslan Demir May 2017 (Year: 2017).*

* cited by examiner

APPARATUSES AND METHODS FOR PACKET DISTRIBUTION ON MULTIPLE SUBSCRIBER IDENTITIES

CROSS REFERENCE TO RELATED APPLICATIONS

This Application claims priority of U.S. Provisional Application No. 62/831,803, filed on Apr. 10, 2019, the entirety of which is incorporated by reference herein.

BACKGROUND OF THE APPLICATION

Field of the Application

The application generally relates to multi-Subscriber Identity Module (SIM) coordination, and more particularly, to apparatuses and methods for packet distribution on multiple subscriber identities.

Description of the Related Art

With the growing demand for ubiquitous computing and networking, various Radio Access Technologies (RATs) have been developed, such as Bluetooth (BT) technology, Wireless-Fidelity (Wi-Fi) technology, Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, New Radio (NR) technology, and others. In particular, GSM/GPRS/EDGE technology is also called 2G cellular technology; WCDMA/CDMA-2000/TD-SCDMA technology is also called 3G cellular technology; LTE/LTE-A/TD-LTE technology is also called 4G cellular technology; and NR technology is also called 5G cellular technology.

Generally, a wireless router, such as a portable Wi-Fi router (also called a pocket Wi-Fi), supports two RATs, such as Wi-Fi technology and 3G/4G cellular technology. The wireless router requires one subscriber identity card to provide a 3G/4G connection, and it is capable of transforming a 3G/4G connection into private WiFi signals, thereby allowing multiple user devices to access the 3G/4G connection via WiFi communications. However, having only one 3G/4G connection may not be able to fulfill the service requirements for all user devices, especially when the number of user devices is large.

BRIEF SUMMARY OF THE APPLICATION

In order to solve the aforementioned problem, the present application proposes to incorporate multiple wireless transceivers supporting multiple RATs into a wireless communication device, e.g., a wireless router, and to use multiple subscriber identities on the wireless communication device for provision of multiple connections on different RATs simultaneously.

In one aspect of the application, a wireless communication device comprising a plurality of wireless transceivers and a controller is provided. Each of the wireless transceivers is configured to perform wireless transmission and reception using a respective Radio Access Technology (RAT). The controller is configured to: enable the wireless transceivers to provide a plurality of wireless connections using a plurality of subscriber identities; select a first wireless connection from the plurality of wireless connections for communications between a user device and the wireless communication device; select a second wireless connection from the plurality of wireless connections according to a service type of a packet flow associated with the user device, for communications between a service network and the wireless communication device; and assign the second wireless connection for routing packets of the packet flow between the user device and the service network.

In another aspect of the application, a method for packet distribution on multiple subscriber identities, executed by a wireless communication device comprising a plurality of wireless transceivers, each of which is configured to perform wireless transmission and reception using a respective RAT, is provided. The method comprises the steps of: enabling the wireless transceivers to provide a plurality of wireless connections using a plurality of subscriber identities; selecting a first wireless connection from the plurality of wireless connections for communications between a user device and the wireless communication device; selecting a second wireless connection from the plurality of wireless connections according to a service type of a packet flow associated with the user device, for communications between a service network and the wireless communication device; and assigning the second wireless connection for routing packets of the packet flow between the user device and the service network.

Other aspects and features of the present application will become apparent to those with ordinarily skill in the art upon review of the following descriptions of specific embodiments of the UEs and the methods for packet distribution on multiple subscriber identities.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
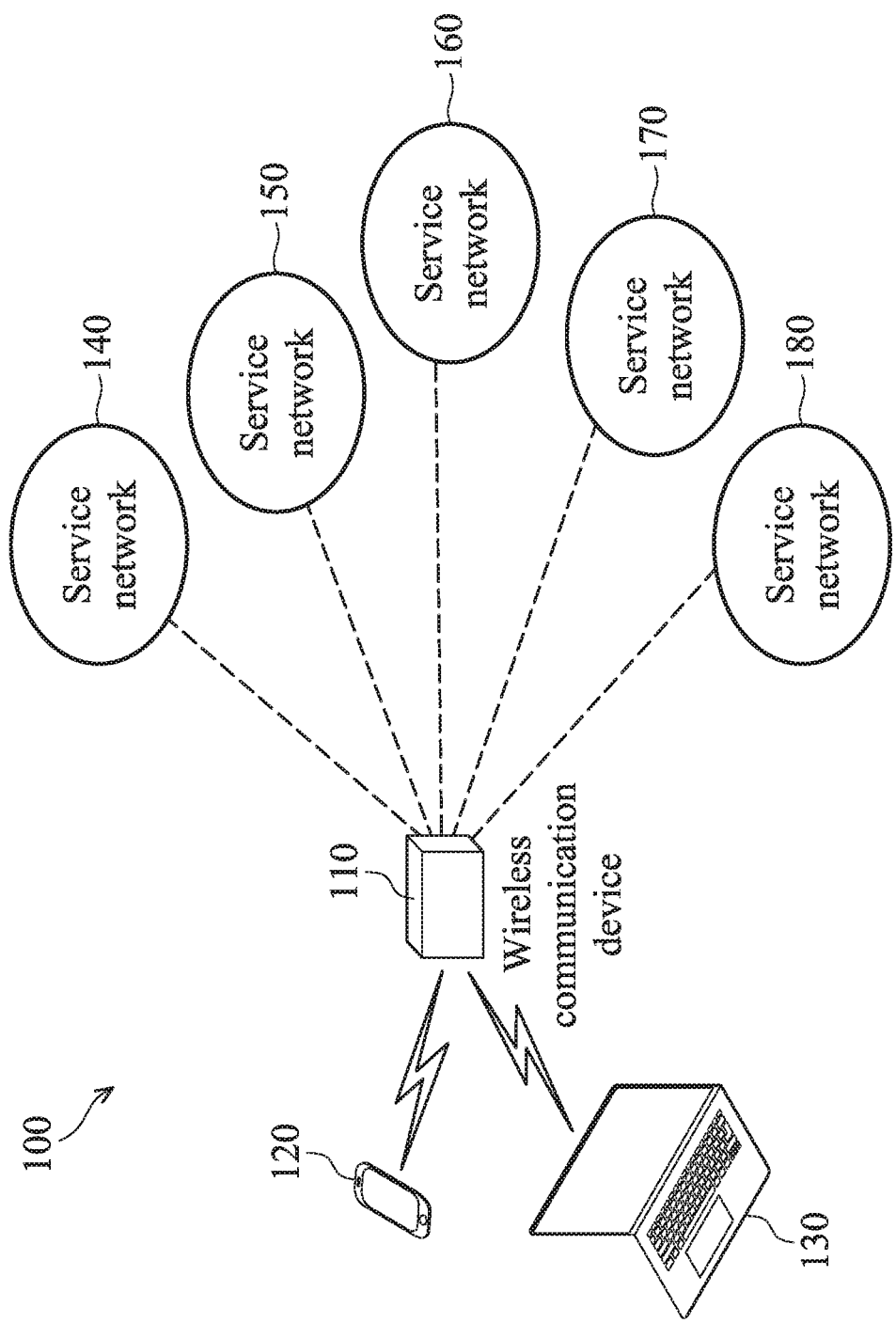
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a wireless communication device 110 which is configured to serve as a wireless router for routing packets between the user devices 120~130 and the service networks 140~180.

The wireless communication device 110 is in communication with various user devices, such as the user devices 120 and 130, using one RAT. Each of the user devices 120 and 130 may be a smartphone, a tablet PC, a laptop computer, a gaming console, a set-top box, or others.

On the other hand, the wireless communication device 110 is in communication with the service networks 140~180 using different RATs. To that end, five separate subscriber identities may be used to provide two connections for the wireless communication device 110 to communicate with the service networks 140~180.

The subscriber identities may be provided by one or more subscriber identity card, such as a Subscriber Identity Module (SIM) card if one of the service networks 140~180 is a 2G/3G network, or a Universal SIM (USIM) card if one of the service networks 140~180 is a 4G/5G network.

Alternatively, the subscriber identities may be directly written into the wireless communication device 110, without the need for any socket to insert any subscriber identity card, or the subscriber identities may be provided by one or more virtual subscriber identity cards (e.g., eSIM/eUSIM), and the present application is not limited thereto.

Specifically, the RATs used to communicate with the service networks 140~180 are different from the RAT used to communicate with the user devices 120 and 130.

In one embodiment, the RAT used to communicate with the user devices 120 and 130 may be Wi-Fi technology or BT technology, while the RATs used to communicate with the service networks 140~180 may be 2G, 3G, 4G, 5G mmWave, and 5G sub-6 cellular technologies. 5G mmWave and 5G sub-6 are both 5G cellular technology, but they operate in different frequency bands. Specifically, 5G mmWave operates in high frequency bands from 30 GHz to 300 GHz, while 5G sub-6 operates in low frequency bands under 6 GHz (e.g., 3.3 GHz~4.9 GHz).

In another embodiment, the RAT used to communicate with the user devices 120 and 130 may be one of 2G, 3G, 4G, 5G mmWave, and 5G sub-6 cellular technologies, while the RATs used to communicate with the service networks 140~180 may be any five of Wi-Fi technology, BT technology, and the rest of 2G, 3G, 4G, 5G mmWave, and 5G sub-6 cellular technologies.

It should be understood that the wireless communication environment 100 described in the embodiment of FIG. 1 are for illustrative purposes only and are not intended to limit the scope of the application. For example, the wireless communication environment 100 may include more user devices and/or more or less service networks, while the wireless communication device 110 may use more or less subscriber identities to provide more or less connections for routing the packets of the user devices.

Figure 2:
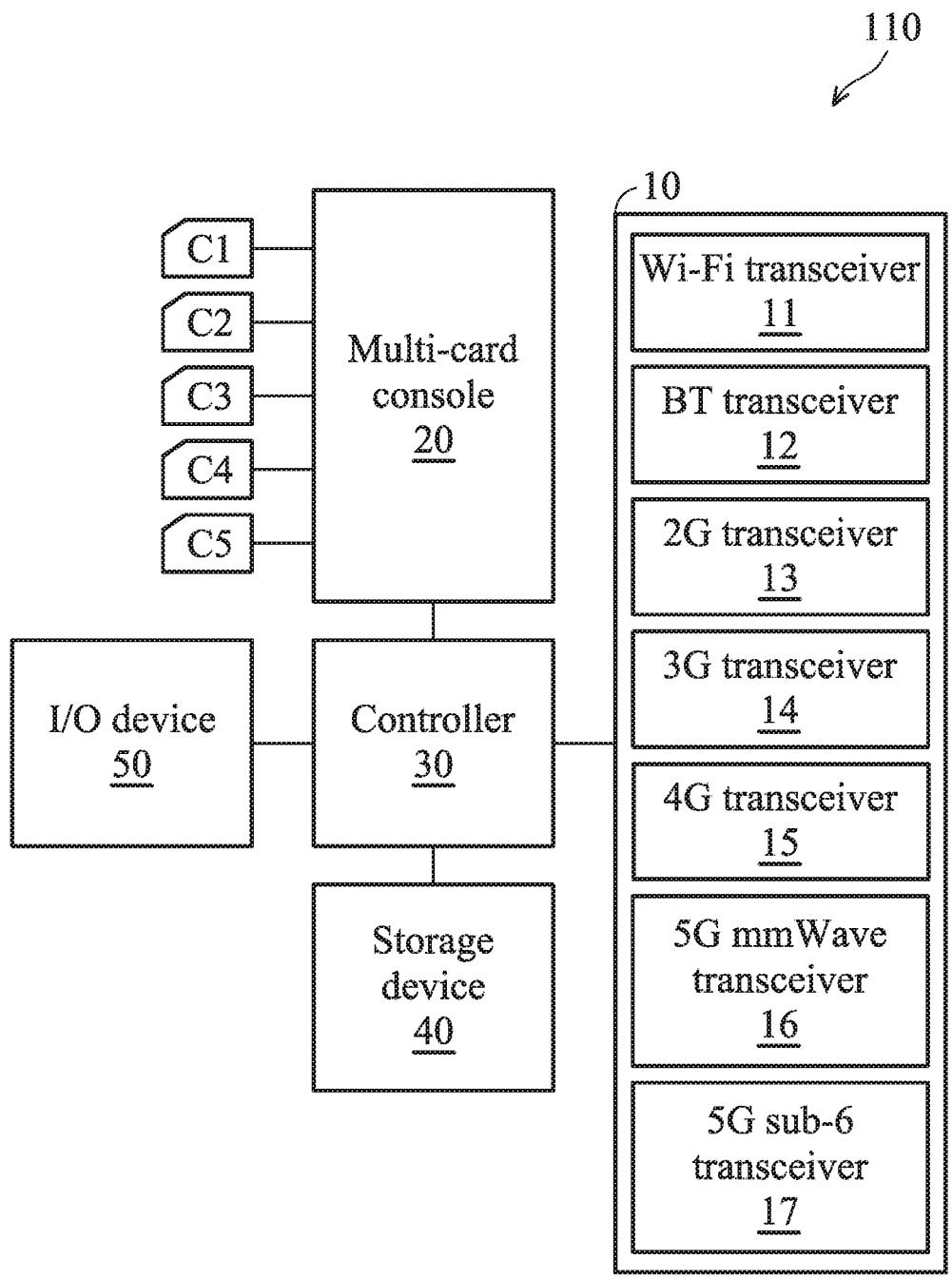
FIG. 2 is a block diagram illustrating the wireless communication device 110 according to an embodiment of the application.

FIG. 2 is a block diagram illustrating the wireless communication device 110 according to an embodiment of the application.

As shown in FIG. 2, the wireless communication device 110 may include a communication combo 10, a multi-card console 20, a controller 30, a storage device 40, and an Input/Output (I/O) device 50.

The communication combo 10 may include a plurality of wireless transceivers, each of which is configured to perform wireless transmission and reception using a respective RAT.

Specifically, the communication combo 10 includes a Wi-Fi transceiver 11, a BT transceiver 12, a 2G transceiver 13, a 3G transceiver 14, a 4G transceiver 15, a 5G mmWave transceiver 16, and a 5G sub-6 transceiver 17.

Each of the Wi-Fi transceiver 11, the BT transceiver 12, the 2G transceiver 13, the 3G transceiver 14, the 4G transceiver 15, the 5G mmWave transceiver 16, and the 5G sub-6 transceiver 17 may include a Radio Frequency (RF) device, a baseband processing device, and an antenna, wherein the antenna may include an antenna array for beamforming.

To further clarify, a baseband processing device may contain multiple hardware components to perform the baseband signal processing, including Analog-to-Digital Conversion (ADC)/Digital-to-Analog Conversion (DAC), gain adjusting, modulation/demodulation, encoding/decoding, and so on.

An RF device may receive RF wireless signals via the antenna, convert the received RF wireless signals to baseband signals, which are processed by the baseband processing device, or receive baseband signals from the baseband processing device and convert the received baseband signals to RF wireless signals, which are later transmitted via the antenna. An RF device may also contain multiple hardware devices to perform radio frequency conversion. For example, an RF device may include a mixer to multiply the baseband signals with a carrier oscillated in the radio frequency of the supported RAT, wherein the radio frequency may be 900 MHz, 1800 MHz or 1900 MHz utilized in the 2G cellular technology, or it may be 900 MHz, 1900 MHz or 2100 MHz utilized in the 3G cellular technology, or it may be 900 MHz, 2100 MHz, or 2.6 GHz utilized in the 4G cellular technology, or it may be 30 GHz~300 GHz (for mmWave) utilized in the 5G cellular technology, or it may be 3.3 GHz~4.9 GHz (for sub-6) utilized in the 5G cellular technology, or it may be another radio frequency, depending on the RAT in use.

The multi-card console 20 is coupled between the controller 30 and the subscriber identity cards C1~C5 for powering the subscriber identity cards C1~C5 with the same or different voltage levels according to the requirements thereof by a Power Management Integrated Chip (PMIC) and a battery, wherein the voltage level for each subscriber identity card is determined during initiation. The controller 30 may read data from one of the subscriber identity cards C1~C5, and writes data to one of the subscriber identity cards C1~C5 via the dual-card console 20. In addition, the dual-card console 20 may selectively transfer clocks, resets, and/or data signals to the subscriber identity cards C1~C5 according to instructions issued by the controller 30.

In another embodiment, the multi-card console 20 may be replaced with one or more card interfaces which collectively or separately handle the communications with the subscriber identity cards C1~C5.

Each of the subscriber identity cards C1~C5 may be a SIM card or a USIM card which is used to enabled one of the 2G transceiver 13, the 3G transceiver 14, the 4G transceiver 15, the 5G mmWave transceiver 16, and the 5G sub-6 transceiver 17 to provide a wireless connection.

In another embodiment, each of the subscriber identity cards C1~C5 may be a virtual subscriber identity card (e.g., eSIM/eUSIM) which is directly written into the storage device 40, without the need for any socket to insert any subscriber identity card.

Please note that the wireless transceivers 11~17 and the subscriber identity cards C1~C5 are for illustrative purposes only and are not intended to limit the scope of the application. For example, there may be only two subscriber identity cards in the wireless communication device 110, and the communication combo 10 may include less or more wireless transceivers, as long as at least two wireless transceivers may be separately enabled for wireless connection provision using two subscriber identities provided by the subscriber identity cards.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the communication combo 10 for wireless communications with the user devices 120~130 and the service networks 140~150, controlling the multi-card console 20 for communications with the subscriber identity cards C1~C5, storing and retrieving data (e.g., program code, and/or eSIM/eUSIM data) to and from the storage device 40, and receiving user inputs or outputting signals via the I/O device 50.

In particular, the controller 30 manages the mapping between the subscriber identity cards C1~C5 and the wireless transceiver 13~17, the wireless connections with the user devices 120~130 and the service networks 140~150, and the packet routing of the packet flows associated with the user devices 120~130. That is, the controller 30 coordinates the aforementioned operations of the communication combo 10, the multi-card console 20, the storage device 40, and the I/O device 50 for performing the method for packet distribution on multiple subscriber identities.

In another embodiment, the controller 30 may be incorporated into a baseband processing device within the communication combo 10.

As will be appreciated by persons skilled in the art, the circuits of the controller 30 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., eSIM/eUSIM data), instructions, and/or program code of applications, communication protocols, and/or the method for packet distribution on multiple subscriber identities.

The I/O device 50 may include one or more buttons, a keyboard, a mouse, a touch pad, a video camera, a display device (e.g., a Liquid-Crystal Display (LCD), a Light-Emitting Diode (LED) display, an Organic LED (OLED) display, or an Electronic Paper Display (EPD), etc.), a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the wireless communication device 110 may include more components, such as a power supply, and/or a Global Positioning System (GPS) device, wherein the power supply may be a mobile/replaceable battery providing power to all the other components of the wireless communication device 110, and the GPS device may provide the location information of the wireless communication device 110 for use by some location-based services or applications.

Figure 3:
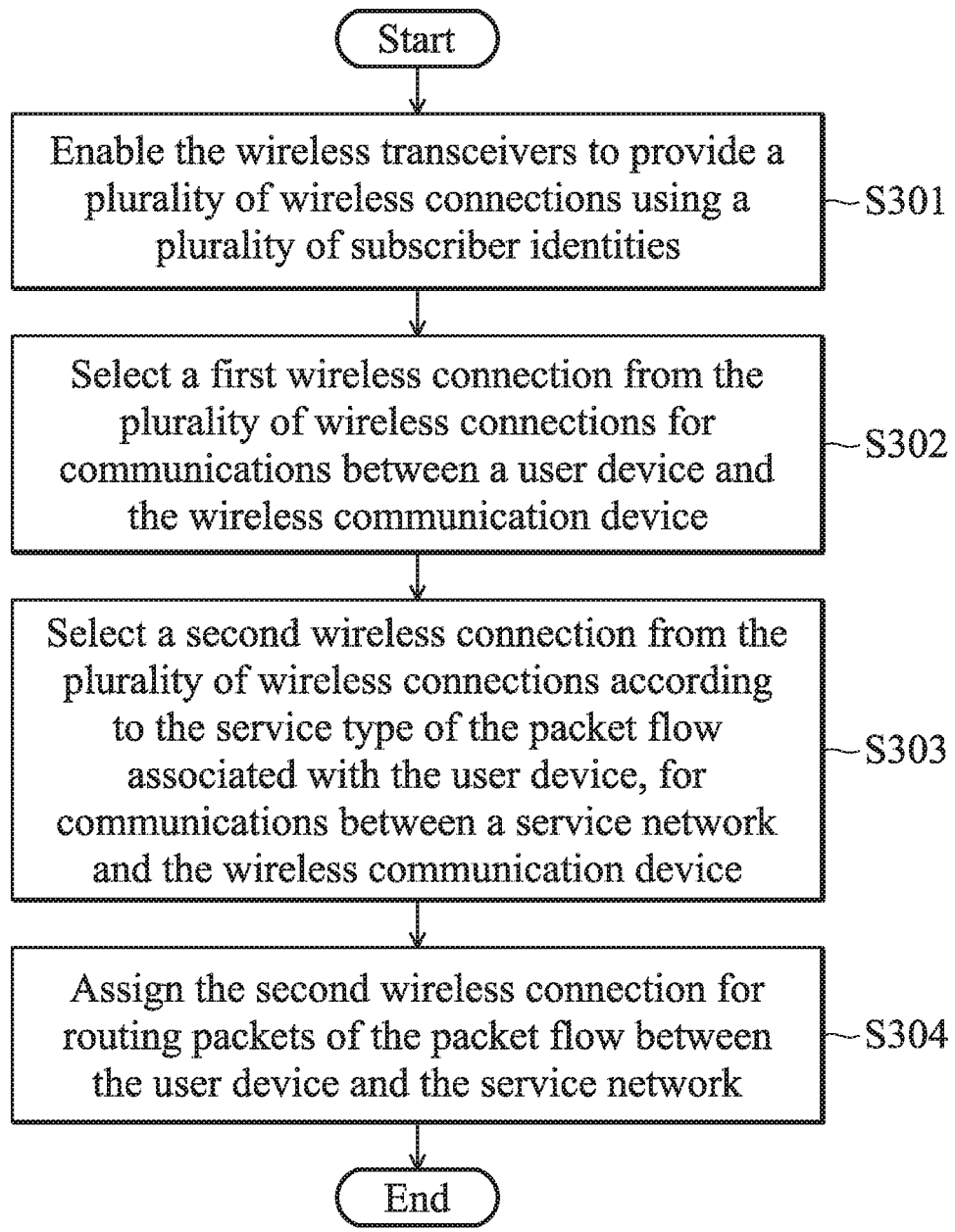
FIG. 3 is a flow chart illustrating the method for packet distribution on multiple subscriber identities according to an embodiment of the application.

FIG. 3 is a flow chart illustrating the method for packet distribution on multiple subscriber identities according to an embodiment of the application.

In this embodiment, the method for packet distribution on multiple subscriber identities is applied to and executed by a wireless communication device (e.g., the wireless communication device 110) which includes a plurality of wireless transceivers, each of which is configured to perform wireless transmission and reception using a respective RAT.

To begin with, the wireless communication device enables the wireless transceivers to provide a plurality of wireless connections using a plurality of subscriber identities (step S301).

Taking the wireless communication device 110 as an example, it may use the subscriber identity cards C1~C5 to enable the wireless transceivers 11~17 to provide a Wi-Fi connection, a BT connection, a 2G connection, a 3G connection, a 4G connection, a 5G mmWave connection, and a 5G sub-6 connection, and a mapping between the subscriber identity cards C1~C5 and the wireless connections is maintained.

Next, the wireless communication device selects a first wireless connection from the plurality of wireless connections for communications between a user device and the wireless communication device (step S302), and selects a second wireless connection from the plurality of wireless connections according to the service type of the packet flow associated with the user device, for communications between a service network and the wireless communication device (step S303).

For example, the first wireless connection may be a Wi-Fi connection, while the second wireless connection may be a 2G/3G/4G/5G connection.

Please note that steps S302 and S303 may be performed not necessarily in such order. That is, step S302 may be performed prior to step S303, or alternatively, step S303 may be performed prior to step S302.

Specifically, step S302 may further include determining the priority order of the RATs when the wireless communication device is configured to serve as a router for the user device, and selecting one of the RATs according to the priority order, which corresponds to the first wireless connection. An example of such priority order is given below in table 1.

TABLE 1

Priority order of RATs for bridging user device to wireless router

Wi-Fi
BT
5G mmWave
5G sub-6

As shown in Table 1, the Wi-Fi technology is the most preferred RAT for use of the first wireless connection, and it is followed by BT, 5G mmWave, and 5G sub-6 in sequence.

Specifically, step S303 may further include determining the priority order of the RATs according to the service type of the packet flow, and selecting the RAT from the top of the priority order, which corresponds to the second wireless connection. An example of such priority order is given below in table 2.

TABLE 2

| Service type | Priority order |
| --- | --- |
| Latency-sensitive<br>(e.g., online gaming, autopilot, remote surgery, etc.) | Wi-Fi<br>5G mmWave<br>5G sub-6<br>4G<br>3G<br>2G |
| High-Throughput<br>(e.g., video streaming, virtual reality, augmented reality, etc.) | Wi-Fi<br>5G mmWave<br>5G sub-6<br>4G<br>3G<br>2G |
| Low-Throughput<br>(e.g., agricultural metering, reservoir water metering, etc.) | 2G<br>3G<br>4G<br>5G sub-6<br>5G mmWave<br>Wi-Fi |
| Budget-effective<br>(user-selected services, such as Multimedia Messaging Service (MMS), IP Multimedia Subsystem (IMS) calls) | Wi-Fi<br>5G mmWave<br>5G sub-6<br>4G<br>3G<br>2G |

As shown in Table 2, the RAT at the top of each priority order is the most preferred RAT for selection of the second wireless connection, and the preferred levels of the rest RATs descend in a top-down direction.

Please note that the examples in Table 1 and Table 2 are for illustrative purposes only and are not intended to limit the scope of the application. For example, the priority order for each service type may vary from the examples in Table 1 and Table 2, and may be preconfigured by the vendor of the wireless communication device according to the location of sale, due to that the network deployment scenario of each RAT may vary in different areas, cities, or countries. Alternatively, the priority order for each service type may be configured by the user/manager of the wireless communication device. For example, the user may select certain type of services as the budget-effective services, and the priority order may be pre-configured in a way that the RAT incurring less cost/charge to the selected type of services (e.g., the RAT with unlimited data plan, or the RAT with sufficient data plan balance) is preferred.

Subsequent to step S303, the wireless communication device assigns the second wireless connection for routing packets of the packet flow between the user device and the service network (step S304), and the method ends.

Figure 4A:
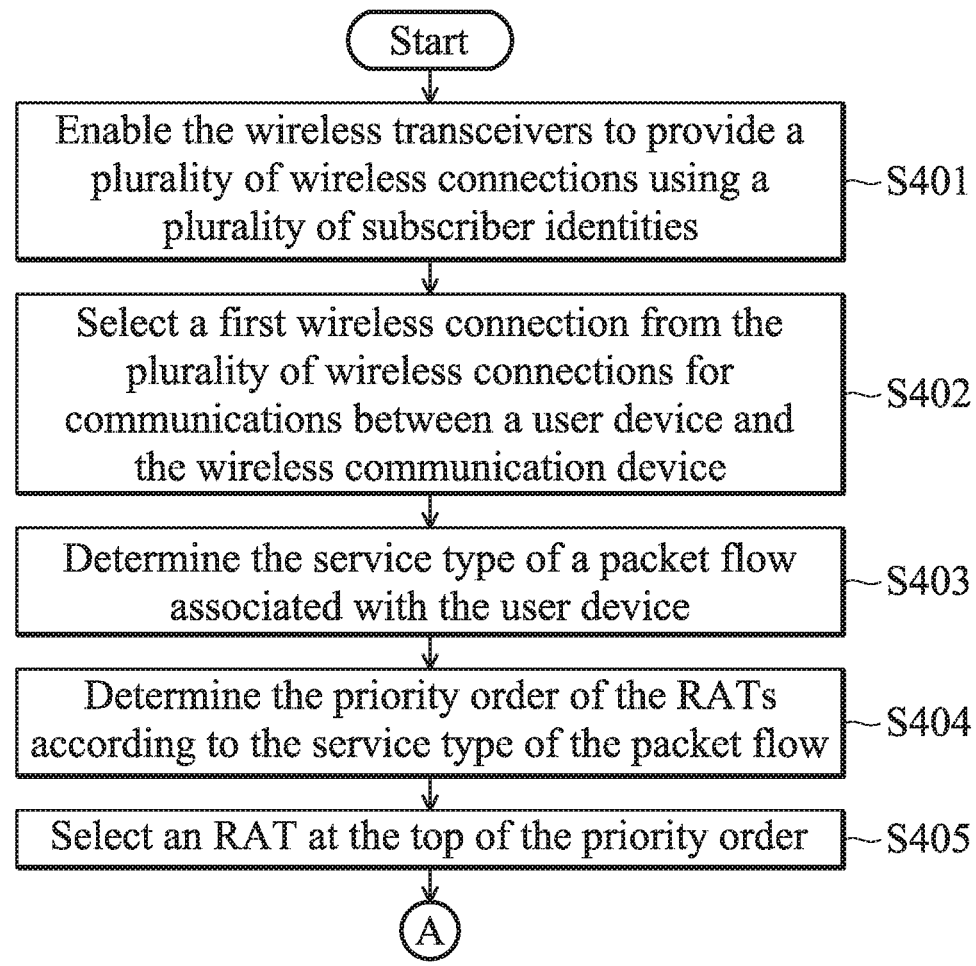
FIGS. 4A and 4B show a flow chart illustrating the method for packet distribution on multiple subscriber identities according to another embodiment of the application.
Figure 4B:
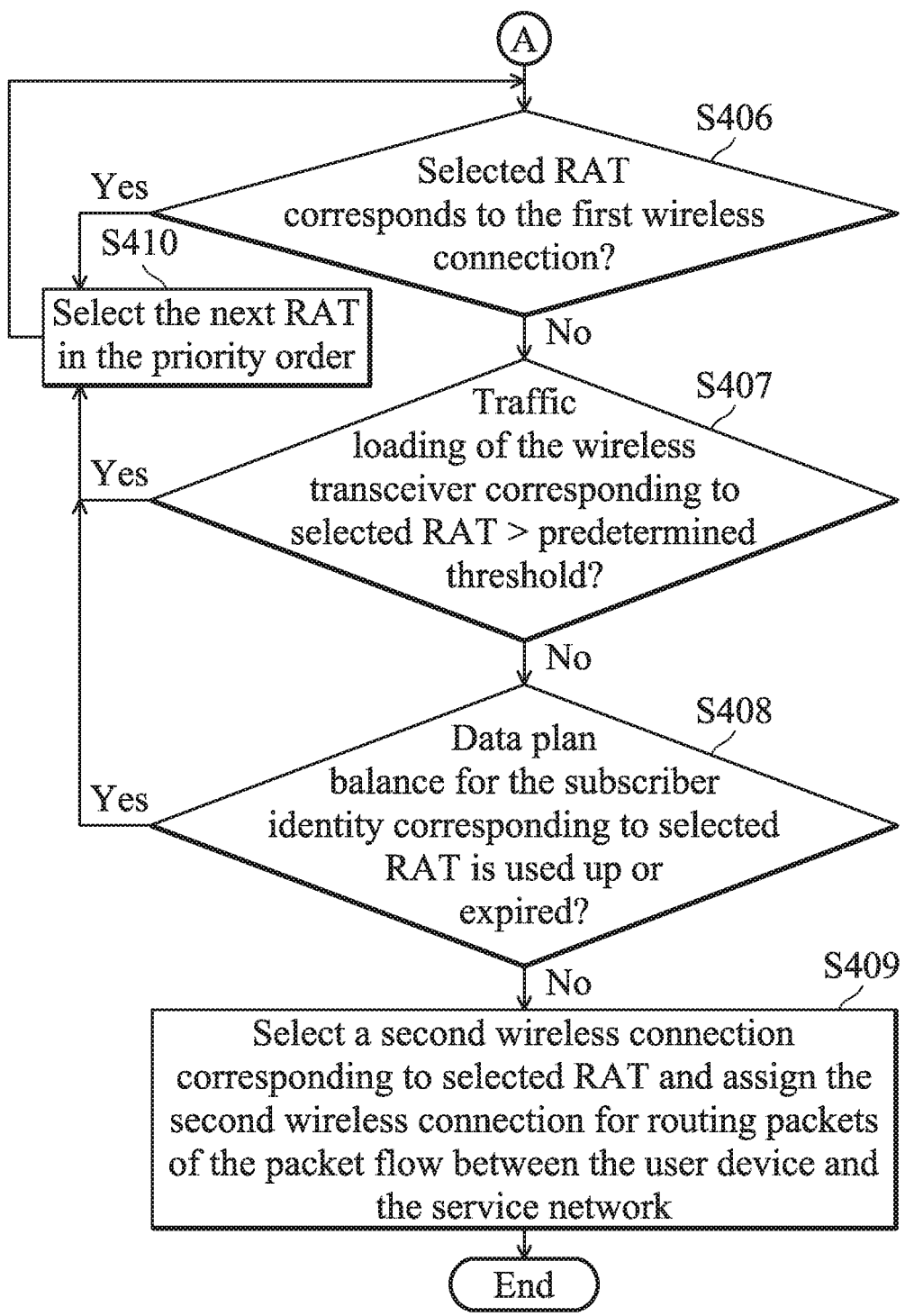

FIGS. 4A and 4B show a flow chart illustrating the method for packet distribution on multiple subscriber identities according to another embodiment of the application.

In this embodiment, the method for packet distribution on multiple subscriber identities is applied to and executed by a wireless communication device (e.g., the wireless communication device 110) which includes a plurality of wireless transceivers, each of which is configured to perform wireless transmission and reception using a respective RAT.

To begin with, the wireless communication device enables the wireless transceivers to provide a plurality of wireless connections using a plurality of subscriber identities (step S401).

Next, the wireless communication device selects a first wireless connection from the plurality of wireless connections for communications between a user device and the wireless communication device (step S402). Specifically, the first wireless connection may be selected according to the priority order of RATs for bridging user device to wireless router, and reference of the detailed description may be made to step S302 in the embodiment of FIG. 3.

Subsequent to step S402, in response to detecting a new packet flow associated with the user device, the wireless communication device determines the service type of the packet flow (step S403), and determines the priority order of the RATs according to the service type of the packet flow (step S404).

Subsequent to step S404, the wireless communication device selects an RAT at the top of the priority order (step S405).

Subsequent to step S405, the wireless communication device determines whether the selected RAT corresponds to the first wireless connection (step S406).

Subsequent to step S406, if the selected RAT does not correspond to the first wireless connection, the wireless communication device determines whether the traffic loading of the wireless transceiver corresponding to the selected RAT is greater than a predetermined threshold (step S407).

Subsequent to step S407, if the traffic loading of the wireless transceiver corresponding to the selected RAT is not greater than a predetermined threshold, the wireless communication device determines whether the data plan balance for the subscriber identity corresponding to the selected RAT is used up or expired (step S408).

Subsequent to step S408, if the data plan balance for the subscriber identity corresponding to the selected RAT is not used up or expired, the wireless communication device selects a second wireless connection corresponding to the selected RAT and assigns the second wireless connection for routing packets of the packet flow between the user device and the service network (step S409), and the method ends.

Subsequent to step S406, if the selected RAT corresponds to the first wireless connection, the wireless communication device selects the next RAT in the priority order (step S410), and the method returns to step S406.

Subsequent to step S407, if the traffic loading of the wireless transceiver corresponding to the selected RAT is greater than a predetermined threshold, the method proceeds to step S410.

Subsequent to step S408, if the data plan balance for the subscriber identity corresponding to the selected RAT is used up or expired, the method proceeds to step S410.

In one embodiment, steps S406~S408 may be optional. That is, any one of steps S406~S408 may be skipped in the method.

In another embodiment, subsequent to step S409, the wireless communication device may keep checking if the second wireless connection no longer fulfills the Quality of Service (QoS) requirement of the packet flow or if any service network utilizing the selected RAT is no longer available, and if so, the wireless communication device may select the next RAT in the priority order and replace the second wireless connection with a third wireless connection corresponding to the next RAT. Specifically, the selection of the next RAT may need to pass the determinations similar to step S407~S408 (by "pass", it means to take the 'N' branch of each decision).

The QoS requirement of the packet flow may include at least one of: 1) the guaranteed bit rate; 2) the latency tolerance range; 3) the maximum acceptable packet loss rate; and 4) the maximum acceptable Bit Error Rate (BER); and the present application should not be limited thereto. Specifically, the QoS requirement is related to the service type of the packet flow. For example, if the packet flow relates to a latency-sensitive service, such as online gaming, autopilot, remote surgery, etc., the QoS requirement may include a latency tolerance range of 7~15 ms; if the packet flow relates to a high-throughput service, such as video streaming, virtual reality, augmented reality, etc., the QoS requirement may include a guaranteed bit rate of 250 Mb/s.

In view of the forgoing embodiments, it should be appreciated that the present application realizes a more robust packet-routing capability for wireless routers, by incorporating multiple wireless transceivers supporting different RATs into a single wireless router and using multiple subscriber identities to provide multiple connections on different RATs simultaneously. In particularly, the wireless router may select the best suitable RAT for each user device based on the service type of the packet flow associated with the user device. Advantageously, the wireless router may be able to serve more user devices and improve the quality of the routing services for the user devices.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method for packet distribution on multiple subscriber identities, executed by a wireless communication device comprising a plurality of wireless transceivers, each of which is configured to perform wireless transmission and reception using a respective Radio Access Technology (RAT), the method comprising:
    enabling the wireless transceivers to provide a plurality of wireless connections using a plurality of subscriber identities;
    selecting a first wireless connection from the plurality of wireless connections for communications between a user device and the wireless communication device;
    selecting a second wireless connection from the plurality of wireless connections according to a service type of a packet flow associated with the user device, for communications between a service network and the wireless communication device; and
    assigning the second wireless connection for routing packets of the packet flow between the user device and the service network;
    wherein the selecting of the second wireless connection comprises:
    determining a priority order of the RATs according to the service type of the packet flow;
    selecting the RAT at the top of the priority order;
    determining whether a traffic loading of the wireless transceiver corresponding to the selected RAT is greater than a predetermined threshold; and
    in response to the traffic loading of the wireless transceiver corresponding to the selected RAT not being greater than the predetermined threshold, selecting the second wireless connection corresponding to the selected RAT.

2. The method of claim 1, wherein the selecting of the second wireless connection comprises:
    in response to the traffic loading of the wireless transceiver corresponding to the selected RAT being greater than the predetermined threshold, selecting a next RAT in the priority order, which corresponds to the second wireless connection.

3. A method for packet distribution on multiple subscriber identities, executed by a wireless communication device comprising a plurality of wireless transceivers, each of which is configured to perform wireless transmission and reception using a respective Radio Access Technology (RAT), the method comprising:
    enabling the wireless transceivers to provide a plurality of wireless connections using a plurality of subscriber identities;
    selecting a first wireless connection from the plurality of wireless connections for communications between a user device and the wireless communication device;
    selecting a second wireless connection from the plurality of wireless connections according to a service type of a packet flow associated with the user device, for communications between a service network and the wireless communication device; and
    assigning the second wireless connection for routing packets of the packet flow between the user device and the service network;
    wherein the selecting of the second wireless connection comprises:
    determining a priority order of the RATs according to the service type of the packet flow; and
    selecting the RAT at the top of the priority order; and
    wherein the selected RAT corresponds to the second wireless connection, and the method further comprises:
    determining whether the second wireless connection no longer fulfills a Quality of Service (QoS) requirement of the packet flow; and
    in response to the second wireless connection no longer fulfilling the QoS requirement of the packet flow, selecting a next RAT in the priority order and replacing the second wireless connection with a third wireless connection corresponding to the next RAT for routing packets of the packet flow.

4. The method of claim 3, wherein the QoS parameter of the packet flow comprises at least one of:
    a guaranteed bit rate;
    a latency tolerance range;
    a maximum acceptable packet loss rate; and
    a maximum acceptable Bit Error Rate (BER).

5. A method for packet distribution on multiple subscriber identities, executed by a wireless communication device comprising a plurality of wireless transceivers, each of which is configured to perform wireless transmission and reception using a respective Radio Access Technology (RAT), the method comprising:

enabling the wireless transceivers to provide a plurality of wireless connections using a plurality of subscriber identities;

selecting a first wireless connection from the plurality of wireless connections for communications between a user device and the wireless communication device;

selecting a second wireless connection from the plurality of wireless connections according to a service type of a packet flow associated with the user device, for communications between a service network and the wireless communication device; and assigning the second wireless connection for routing packets of the packet flow between the user device and the service network;

wherein the selecting of the second wireless connection comprises:

determining a priority order of the RATs according to the service type of the packet flow; and selecting the RAT at the top of the priority order; and wherein the selected RAT corresponds to the second wireless connection, and the method further comprises:

determining whether any service network utilizing the selected RAT is no longer available; and in response to any service network utilizing the selected RAT being no longer available, selecting a next RAT in the priority order and replacing the second wireless connection with a third wireless connection corresponding to the next RAT for routing packets of the packet flow.

* * * * *